March 28, 1939.  M. BOTTI  2,152,023
ROAST RACK
Filed Sept. 7, 1938
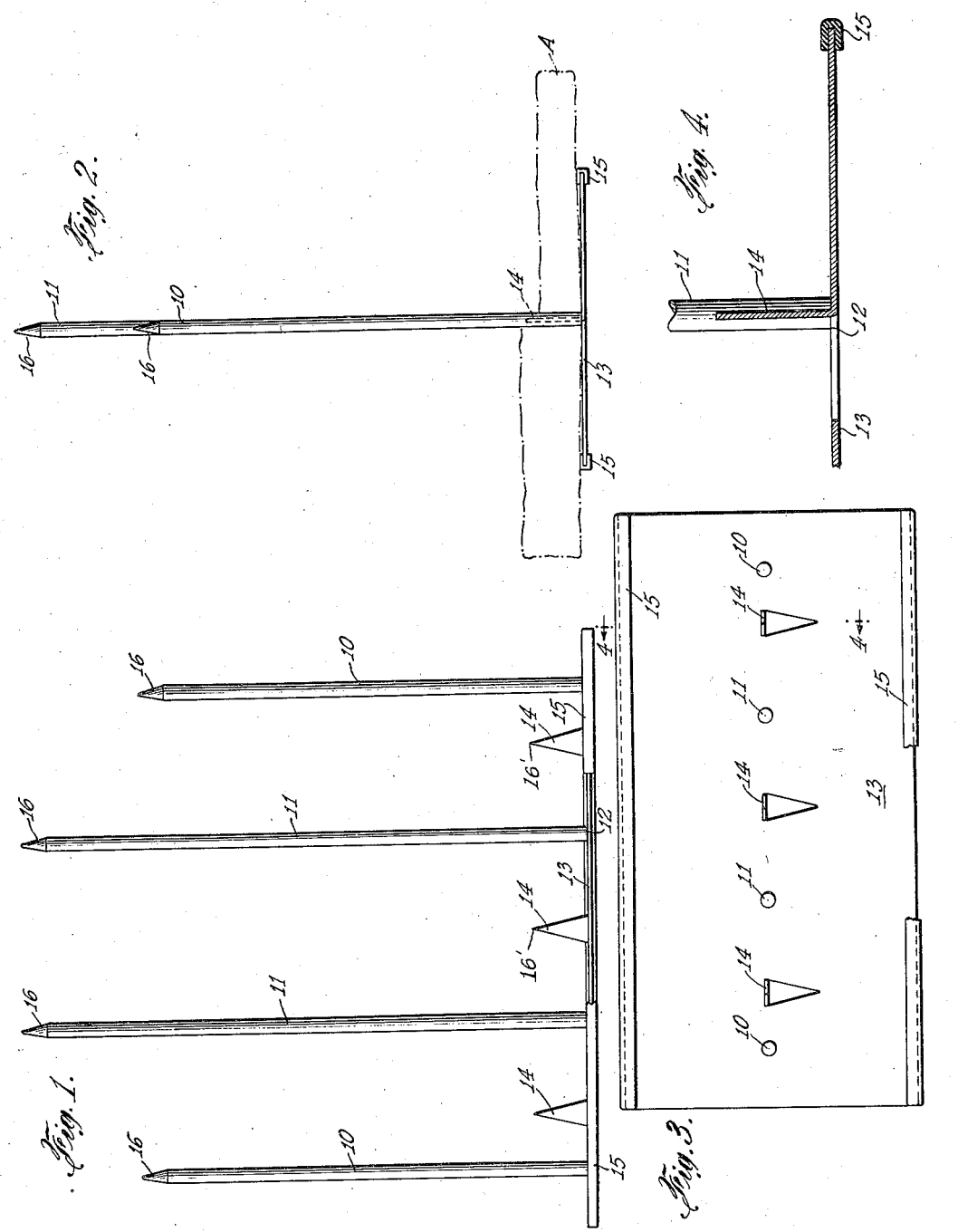
INVENTOR.
Michael Botti
BY Benjamin Webster
ATTORNEY.

Patented Mar. 28, 1939

2,152,023

UNITED STATES PATENT OFFICE 2,152,023

ROAST RACK

Michael Botti, Brooklyn, N. Y.

Application September 7, 1938, Serial No. 228,753

3 Claims. (Cl. 65—15)

This invention relates to roast racks for holding a pot roast or a fowl on a platter for facilitating the operation of carving.

The objects of the invention, among others, are to provide a simple rack holder having a row of pointed studs transversely and centrally mounted on a base plate which is constructed to rest firmly on a platter, some of the studs rising higher than the roast when fixed thereon so that the position of the row is always apparent to a carver; to provide such a holder in which a second row of prongs is mounted on the base plate and of such a height as to pierce and hold the bottom of a roast, this second row of prongs being triangular in shape and extending transversely of the base-plate and interposed between the first row studs and adapted to hold the extreme bottom of the roast when carving to prevent waste of slices; and to provide such a device that is strong and durable, of attractive appearance, and of low manufacturing cost. Other objects will appear as the description proceeds.

Reference is made to the drawing in which,

Figure 1 is an end elevation of the device,

Figure 2 is a side view of the device,

Figure 3 is a plan view of the device, and

Figure 4 is a section on the line 4—4 of Figure 3.

In the modification shown in the drawing, cylindrical rods 10 and intermediate cylindrical rods 11 are mounted in a row, the rods 11 being longer than the rods 10 to project above any ordinary roast. These rods 10 and 11 are formed at the top with conical points 16 for piercing a roast of meat. They are fastened at the bottom by spot welding 12 to a rectangular plate 13, centrally of the plate and transversely thereto. A second row of prongs 14 triangular in outline are turned up from the plate 13 to form points 16' which are interposed centrally between the rods 10 and 11 in the same row and having their faces at right angles to the plate and in line with the rods 10 and 11. Opposite sides of the plate 13 are covered with rubber strips 15 which are pressed tightly on the edges of the plate 13.

As shown in Figure 2, when a roast, such as a pot roast, is placed on the prongs 10 and 11 and on the prongs 14 it is securely held so that carving may be done from opposite sides up to the posts 10 and 11. The roast is usually prepared with the fibers running up and down so that the slices break away sharply from a line through the posts. When the carving has proceeded to the bottom of the roast A the prongs 14 securely hold the roast so as to permit slicing to the bottom of the roast without any waste of slices, the carving being done from opposite sides of the row of prongs 14. The rubber rims 15 hold the plate 13 slightly above the surface of a platter on which the roast is placed and therefore assure an even foundation by providing resilient accommodation to irregularities and slightly off-setting the plate 13 from the platter. The rubber 15 also provides a friction grip when a roast is on the base 13 which prevents the device from slipping about the platter. The rack is intended to be placed on the platter with the posts 10 and 11 in a cross-wise direction with reference to the platter.

Having shown and described a modification of my invention and realizing that in view of my disclosure many changes will occur to those skilled in the art, I do not limit myself except as in the appended claims.

I claim:

1. A roast rack for carving roasts comprising, in combination, a base plate of substantial area so formed as to rest firmly on a meat platter, a row of pointed studs centrally and transversely mounted on the base plate, some of the studs being of sufficient height to protrude above the roast when the latter is fixed on the rack, and a second row of prongs centrally and transversely mounted on the base plate and interposed between the row of pointed studs for piercing the bottom of the roast and firmly holding the lower part thereof.

2. A roast rack for carving roasts comprising, in combination, a base plate of substantial area so formed as to rest firmly on a meat platter, a row of pointed studs centrally and transversely mounted on the base plate, some of the studs being of sufficient height to protrude above the roast when the latter is fixed on the rack, and a second row of prongs centrally mounted on the base plate and interposed between the row of pointed studs for piercing the bottom of the roast and firmly holding the lower part thereof, said second row of prongs being triangular pieces at right angles to the base plate and transverse thereto and made of thin metal.

3. A roast rack for carving roasts comprising, in combination, a base plate of substantial area so formed as to rest firmly on a meat platter, a row of pointed studs centrally and transversely mounted on the base plate, some of the studs being of sufficient height to protrude above the roast when the latter is fixed on the rack, a second row of prongs centrally mounted on the base plate and interposed between the row of pointed studs for piercing the bottom of the roast and firmly holding the lower part thereof, said second row of prongs being triangular pieces at right angles to the base plate and transverse thereto and made of thin metal, and rubber rims on opposite sides of the base plate for frictionally gripping a meat platter and overcoming irregularities in the platter.

MICHAEL BOTTI.